UNITED STATES PATENT OFFICE.

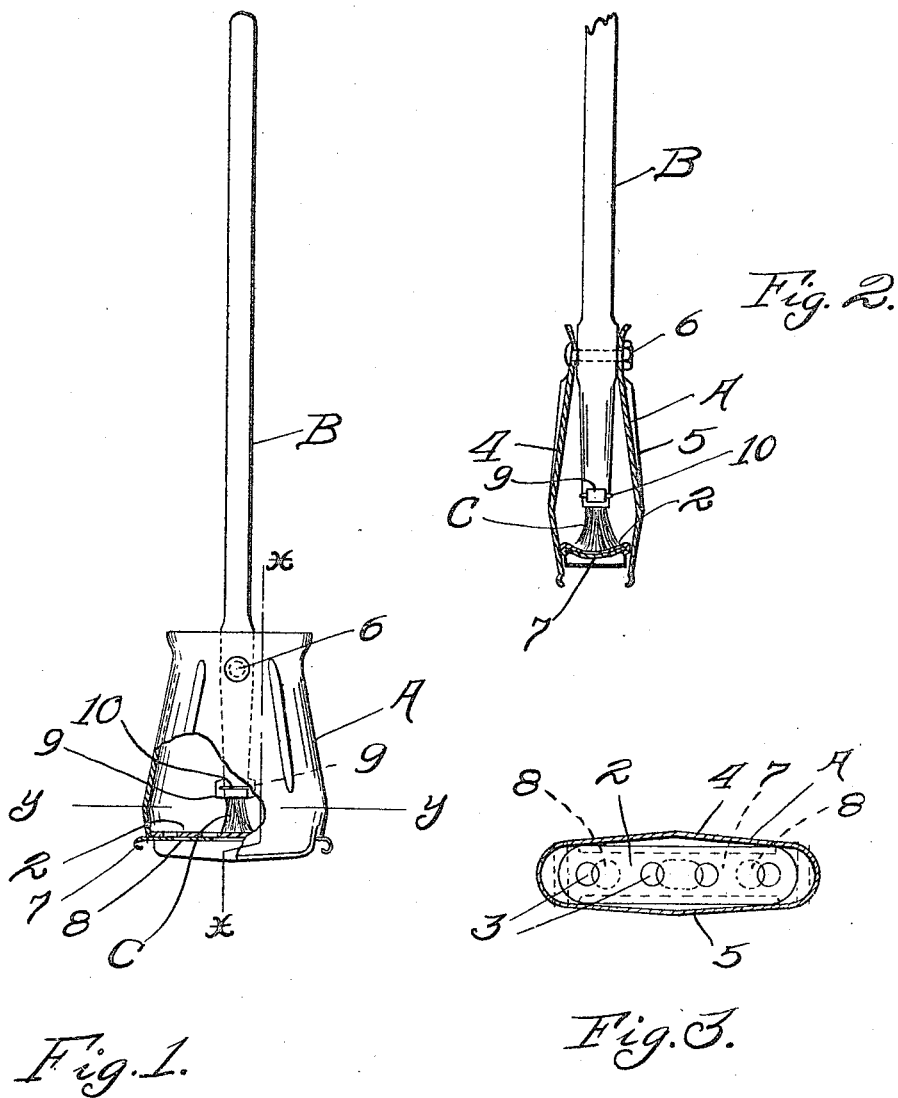

FRANCIS WHITE, OF LITTLEFORK, MINNESOTA.

SEEDER.

1,137,683.

Specification of Letters Patent.  Patented Apr. 27, 1915.

Application filed May 29, 1914.  Serial No. 841,794.

*To all whom it may concern:*

Be it known that I, FRANCIS WHITE, a citizen of the United States, residing at Littlefork, in the county of Koochiching and State of Minnesota, have invented a new and useful Improvement in Seeders, of which the following is a specification.

This invention relates to a hand seeder, which is simple in construction and effective in operation.

The primary object of this invention is to provide a seeder of this class which shall greatly lighten the very laborious work of planting seeds.

A further object is to provide a hand seeder which will not clog and which can be regulated for planting seeds of various sizes.

A still further object is to provide a seeder which will regularly plant substantially the desired number of seeds when in use.

In the accompanying drawing forming part of this specification, Figure 1 is a side elevation, part of the structure being broken away to expose the inner mechanism; Fig. 2 is a vertical section taken on the line X—X of Fig. 1 and Fig. 3 is a section taken on the line Y—Y of Fig. 1.

In the drawing A indicates a narrow magazine or shaker of sufficient depth to hold a quantity of seeds to be planted, said receptacle being formed with an upper open end and with a floor 2, which is provided with a series of openings 3.

Placed between the side walls 4 and 5 of the receptacle is an upwardly extending handle B, which is pivoted above its lower end by the bolt 6 passing through said side walls, so that when the handle B is swung the shaker is oscillated on said pivot. The lower end of the handle carries a brush C, which is adapted to sweep over the series of openings 3 when the handle is swung in the manner stated, to brush the seeds through the bottom and prevent them from clogging the openings. A slide 7 having a series of openings 8 is slidably mounted in the wall of the shaker immediately adjacent the floor, its openings being adapted to fully or partly register with the openings 3 and thus regulate the sizes of the passages through which the seeds in the receptacle are adapted to pass. By regulating this slide the seeder can be made to accommodate different sizes of seeds or assist in regulating the amount of seeds which are adapted to pass through the openings each time the seeder is moved to a new position.

In use the device is carried and swung by the handle over the ground where the seeds are to be planted so as to cause the brush C to agitate the seeds and deposit them through the apertures in the floor on the ground. It will be noted that the floor 2 and slide 7 below the floor are arranged a short distance above the lower edges of the receptacle, the object being to form guards at the sides of the apertured end above the ground so that the seeds will drop within a limited zone on the ground. The lower end of the handle is also provided with bumpers 9 made of felt or other suitable material, so that the wall of the shaker will not be detented by the handle. These bumpers are fastened to the handle by a wire band 10 or other suitable means. The use of this device is adapted to save labor and enable a person to plant seeds without stooping over which obviously are very material advantages.

In accordance with the patent statutes, I have described the principles of operation of my invention, together with the apparatus, which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A seeder, comprising, in combination, a shaker adapted to form a magazine for holding seeds to be planted, said shaker having seed apertures in its lower end, and a handle pivoted above the lower portion of said receptacle and having a brush which is adapted to sweep over said apertures when said handle is swung and said shaker is oscillated upon its pivot support.

2. A seeder, comprising, in combination, a receptacle having seed passages in its lower end, an apertured slide adapted to overlap said passages to regulate their sizes, an upwardly extending handle pivoted above its lower end on said receptacle and having its lower end in close proximity to said passages and a brush carried by the lower end of said handle adapted to sweep over said passages.

3. A seeder, comprising, in combination, a shaker receptacle adapted to hold seeds and having an apertured floor spaced above its lower end, an upwardly extending handle pivoted above its lower end on said receptacle and having its lower end in close proximity to said floor over the apertures therein, said receptacle being formed with guards below its floor to confine seeds passing through said openings to a limited zone upon the ground.

In testimony whereof, I have signed my name to this specification, in the presence of two subscribing witnesses.

FRANCIS WHITE.

Witnesses:
P. P. STOLTZMAN,
NELS MEMS.

Copies of this patent may be obtained for five cents each, by addressing the "Commissioner of Patents. Washington, D. C."